United States Patent
Zacks et al.

(10) Patent No.: US 8,087,054 B2
(45) Date of Patent: Dec. 27, 2011

(54) AUTOMATED EVENT CONTENT PROCESSING METHOD AND SYSTEM

(75) Inventors: Carolyn A. Zacks, Rochester, NY (US);
Michael J. Telek, Pittsford, NY (US);
Frank Marino, Rochester, NY (US);
Dan Harel, Rochester, NY (US);
Douglas B. Beaudet, Geneseo, NY (US)

(73) Assignee: Eastman Kodak Company, Rochester, NY (US)

(*) Notice: Subject to any disclaimer, the term of this patent is extended or adjusted under 35 U.S.C. 154(b) by 2039 days.

(21) Appl. No.: 10/260,975

(22) Filed: Sep. 30, 2002

(65) Prior Publication Data

US 2004/0064207 A1    Apr. 1, 2004

(51) Int. Cl.
H04N 7/10       (2006.01)
H04N 7/025      (2006.01)
H04N 5/445      (2011.01)
H04N 7/173      (2011.01)
H04N 7/16       (2011.01)
G06F 13/00      (2006.01)
G06F 3/00       (2006.01)

(52) U.S. Cl. ............... 725/86; 725/32; 725/37; 725/135
(58) Field of Classification Search ............... 725/131
See application file for complete search history.

(56) References Cited

U.S. PATENT DOCUMENTS

| | | | |
|---|---|---|---|
| 5,610,653 A * | 3/1997 | Abecassis | 348/170 |
| 5,623,581 A | 4/1997 | Attenberg | |
| 5,729,471 A * | 3/1998 | Jain et al. | 725/131 |
| 5,819,250 A * | 10/1998 | Trader et al. | 707/758 |
| 6,020,883 A * | 2/2000 | Herz et al. | 715/721 |
| 6,085,195 A | 7/2000 | Hoyt et al. | |
| 6,204,862 B1 | 3/2001 | Barstow et al. | |
| 6,227,974 B1 | 5/2001 | Eilat et al. | |
| 6,229,904 B1 | 5/2001 | Huang et al. | |
| 2002/0157095 A1 * | 10/2002 | Masumitsu et al. | 725/46 |
| 2002/0166123 A1 * | 11/2002 | Schrader et al. | 725/58 |
| 2002/0188959 A1 * | 12/2002 | Piotrowski | 725/112 |

FOREIGN PATENT DOCUMENTS

| | | |
|---|---|---|
| EP | 0 719 046 A | 6/1996 |
| EP | 1113371 | 7/2001 |
| WO | WO 00/05884 A | 2/2000 |
| WO | WO 02/07164 A | 1/2002 |

OTHER PUBLICATIONS

A. Ekin and A. M. Tekalp, "A Framework for Tracking and Analysis of Soccer Video", Conference . Publication Sep. 2002.
Contact Magazine, No. 8, Published May 8, 2000, "Mobile Internet Takes you to the Ice" by Gunilla Tamm, Published by LM Ericsson Telephone Company, Stockholm, Sweden.
Contact Magazine No. 4, Published Mar. 4, 2001; "Handheld Device Transports Audience Onto the Ice" Publish by LM Ericsson Telephone Company, Stockholm, Sweden www.ericsson.com/about/publications/kon_con/contact/cont04_01/feat.shtml.

* cited by examiner

Primary Examiner — Justin Shepard
(74) Attorney, Agent, or Firm — Roland R Schindler; Raymond L. Owens

(57) ABSTRACT

A method for organizing event content in the form of electronic signals is provided. In accordance with this method an event profile is determined. The event content is obtained and the event content is organized based upon the event profile.

3 Claims, 13 Drawing Sheets

```
                    EVENT PROFILE ENTRY

1. EVENT CATEGORY:     TIMED SPORTING EVENT

2. SPORT:              SOCCER GAME-NON PROFESSIONAL

3. EVENT AGENDA:       FIRST HALF 30:00 MINUTES

HALF-TIME 10:00 MINUTES

SECOND HALF 30:00 MINUTES

4. KEY EVENT
CIRCUMSTANCES:
                       1. BALL IN GOAL (WHITE AND BLACK
                       OBJECT IN ZONE 1)

2. BALL NEAR GOAL (WHITE AND BLACK
                       OBJECT IN ZONE 1)

3. RED CARD
```

*FIG. 4*

PERSONAL PROFILE ENTRY

1. PREFERRED CONTENT— HIGH PRIORITY
    A. MONITOR ZONE 1
    FIRST HALF/ZONE 3
    SECOND HALF
2. PARTICIPANTS OF INTEREST— HIGH PRIORITY
    A. IMAGE OF PARTICIPANT
    B. UNIFORM NUMBER(s) — 34, 53
    C. POSITION OF PARTICIPANTS(S)
    OF INTEREST — FULLBACK, GOALIE
3. NON-PARTICIPANTS OF INTEREST—MEDIUM PRIORITY
    A. IMAGE OF NON-PARTICIPANT
    B. LOCATION OF PARTICIPANT OF INTEREST
4. SOURCES
    A. VIDEO FROM CAMERAS 32, 34, 36
    B. ADDITIONAL CAMERA 54
    C. ADDITIONAL CAMERA 56
5. OUTPUT
    A. MAKE A VIDEO DISK (4 MINUTES OF CONTENT)
    B. MAKE A PHOTO ALBUM
    C. MAKE A DVD OF GAME— SELECTED OPTION
    D. MAKE AND SEND A VIDEO POSTCARD
    E. MAKE A COMPOSIITE POSTCARD
    F. MAKE AND SEND A COMPOSITE IMAGE
6. SHARE
    A. SHARE CONTENT
    B. SHARE METADATA

*FIG. 5*

IMPORTANCE SCORES

FIRST HALF CONTENT ⌒ 124

| CONTENT | RELATIVE IMPORTANCE BASED ON EVENT RULES | RELATIVE IMPORTANCE BASED ON PERSONAL PROFILE | TOTAL |
|---|---|---|---|
| 112 | 100 | 100 | 200 |
| 174 | 90 | 92 | 182 |
| 132 | 85 | 90 | 175 |
| 154 | 85 | 85 | 170 |
| 152 | 85 | 80 | 165 |
| 170 | 90 | 70 | 160 |
| 110 | 70 | 70 | 140 |
| 114 | 70 | 70 | 140 |
| 172 | 50 | 70 | 120 |
| 150 | 50 | 50 | 100 |
| 180 | 50 | 20 | 70 |
| 134 | 50 | 10 | 60 |
| 130 | 45 | 10 | 55 |

HALF-TIME CONTENT 126

| CONTENT | RELATIVE IMPORTANCE BASED ON EVENT RULES | RELATIVE IMPORTANCE BASED ON PERSONAL PROFILE | TOTAL |
|---|---|---|---|
| 176 | 90 | 90 | 180 |
| 136 | 60 | 50 | 140 |
| 156 | 50 | 50 | 100 |
| 116 | 50 | 45 | 95 |
| 176 | 40 | 45 | 85 |
| 178 | 40 | 40 | 80 |

*FIG. 7A*

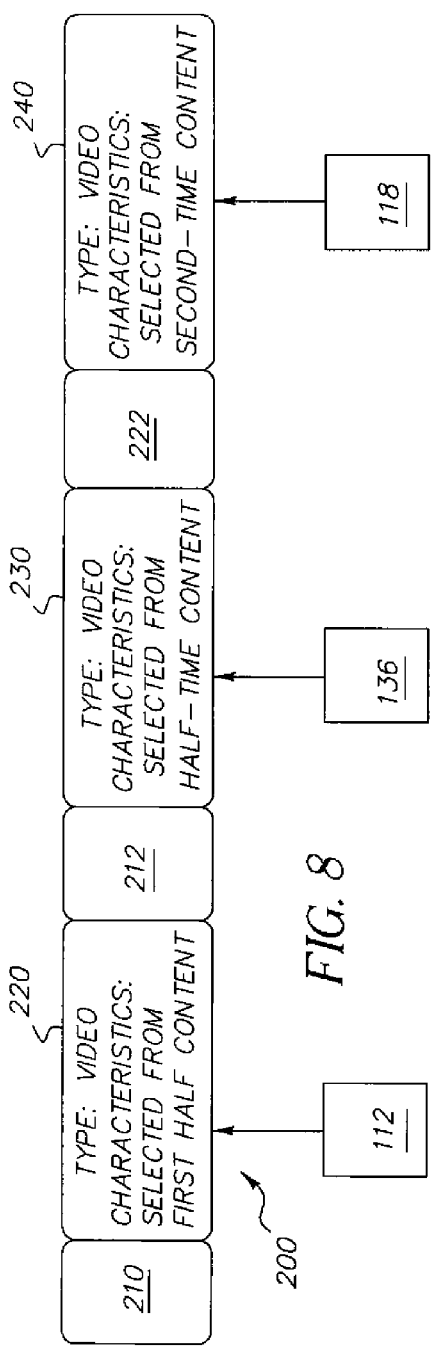
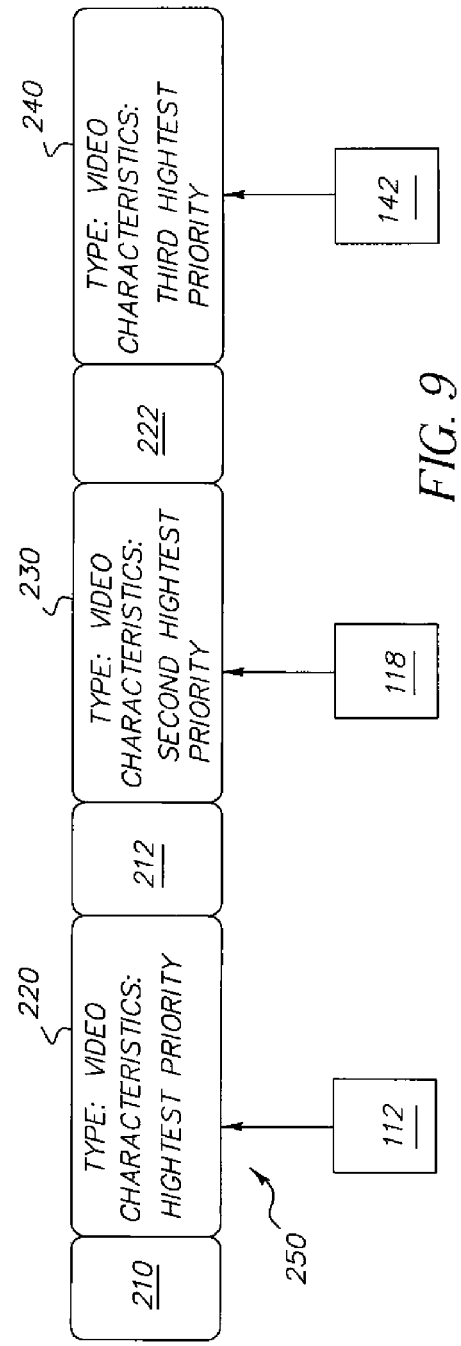
FIG. 8
FIG. 9

AUTOMATED EVENT CONTENT PROCESSING METHOD AND SYSTEM

Reference is made to commonly assigned copending U.S. patent application Ser. No. 09/918,287, entitled A SYSTEM AND PROCESS FOR OFFERING IMAGING SERVICES filed Jul. 30, 2001 in the name of Novais et al.

FIELD OF THE INVENTION

This invention relates generally to methods and systems for arriving at output product from content such as audio, video and still images captured at an event.

BACKGROUND OF THE INVENTION

Sporting events, stage productions, banquets and wedding receptions are often recorded using video image capture. Such events are relatively long but consist of short segments that are of particular interest. Often, recordings made during such events include substantially more content than the short segments that are of particular interest. Recordings that include all of this content are not conveniently viewed and shared with others after the event. Accordingly, the content related to an event is typically processed by an editor after the event occurs. The editor reviews the content and reduces this content to create an output product such as a videotape, digital video disk, or photographic album that contains principally only coverage of preferred segments of the event. However, the process of manually reducing such content into an output product is time consuming and expensive.

One less time consuming and less expensive alternative is for a camera operator to limit the content that is captured at an event to include only preferred segments of the event. Thus the camera operator must actively edit the scene to carefully balance the need to reduce the volume of content captured against the risk of omitting preferred content. This, in turn, can prevent the camera operator from appearing in the captured content and participating in and enjoying the event. Further, this creates a risk that content that is of particular interest to certain observers may be unnecessarily omitted. Thus what is needed is an easier way to capture and produce an output product containing preferred event content.

The challenge of producing an output product from event related content is even more difficult where there are multiple sources of event content that must be integrated to form the output product. This problem has become more acute in recent years with the proliferation of relatively inexpensive capture devices such as analog and digital video cameras, digital still cameras and conventional cameras, which have caused a marked increase in content that is captured in an event. Thus, for many events, there is often a supply of uncoordinated event related content that is available for use in generating an output product. Here too it is necessary to use post production editing to properly combine content that is captured at an event by multiple cameras to form such an output product. This requires a substantial investment in labor.

The amount of labor required to form an output product from multiple media sources can be reduced using automated editing and content management software such as are described in U.S. Pat. No. 6,191,407 entitled "Method and Apparatus for Manifesting Representations of Scheduled Elements in a Broadcast Environment", filed Oct. 7, 1996, by Boetje et al. Using the system of the '407 patent, scheduled broadcast elements are organized and managed so as to facilitate the process of generating a broadcast such as a television evening news broadcast that incorporates content from various inputs including recorded content, live broadcast content and live local commentary. To accomplish this, the constituent portions of the broadcast are broken into elements. At least one corresponding material is specified for each broadcast element. At least one corresponding media that represents the corresponding material is also specified. The specifications are used to organize the content of the broadcast so that the broadcast can be made within predefined time limits despite variations that may occur in the duration of any segment. However, the system of the '407 patent, still requires the assistance of production and directing staffs to define, organize and assign a corresponding material and corresponding media to the elements.

A further need in the art is for a way to efficiently customize manually edited content such as a sports broadcast or a commemorative video to incorporate content that reflects the viewing interests of different event participants. For example, a wedding video may incorporate content of the groom's family and the bride's family. Certain relatives of the bride, for example, may have limited interest in content depicting the groom's family and a higher interest in content depicting the bride's family. The converse may also be true. However, while the cost of a videographer and video editor for the purpose of recording a wedding is typically willingly borne by a family, the cost of producing multiple versions of the same event that are adapted to the preferences of the various families remains prohibitive.

There have been attempts to permit automated production of output products that incorporate custom content. For example, commonly assigned U.S. Pat. No. 6,147,200 entitled "Photofinishing System and Method for Automated Advanced Services Including Image and Associated Audio Data Processing" filed on Feb. 26, 1998 by Bell et al. provides a photofinishing system that automatically processes images from image related data in terms of image content in the content of non-image data associated with an image pursuant to customer output requests. Using this system, a plurality of image sources such as multiple rolls of film each having some content that is captured at a wedding can be processed to derive for example, a composite image composed of photographs of the wedding found on the rolls of film. Other forms of images and audio content can also be integrated to form other types of output. This system analyzes the content of the images and associated non-image data associated with the images and develops associations based on this analysis. The associations are then used to help form the requested output product. This system greatly reduces the amount of labor required to form an output from content recorded on separate media.

In another example, in U.S. Pub. No. US2001/0003846 A1 entitled "Encapsulated, Streaming Media Automation and Distribution System" filed on Dec. 1, 2000 by Rowe et al., a system and method are provided for creating programming content carried by a digital streaming media to a plurality of remote nodes located over a large geographic area to create customized broadcast programming at the remote nodes. The system permits a remote user to customize content that is to be incorporated into the broadcast of a primary video stream. This allows the primary data stream, such as a motor car race, to include interruptions and overlays that incorporate, for example, regional content such as weather, local news or local commercials. This however, does not permit the remote modification of the event content contained within the primary data stream.

What is needed, therefore, is a way to form an output product that incorporates event related content from a variety of sources in accordance with user preferences.

SUMMARY OF THE INVENTION

In one aspect of the invention, a method for organizing event content recorded in the form of electronic signals is provided. In accordance with the method, an event profile is determined. The event content is obtained and the event content is organized based upon the event profile.

In another aspect of the invention, a method for forming an output product based upon captured event content is provided. In accordance with the method, an event profile is determined and a personal profile is determined. Event content is obtained and the content is organized based upon the event profile and the personal profile. An output product is assembled having content selected based upon the organized content.

In still another aspect of the invention, a method for processing a plurality of channels of event content is provided. In accordance with this method, a set of event rules is defined. Each channel of content is analyzed based upon the set of event rules. At least one channel of primary content from the channels of event content is assembled based upon the rules for the event.

In still another aspect of the invention, a method for processing primary and secondary channels of event content is provided. In accordance with this method, an output product comprising a template of content elements is selected and a primary channel of content for incorporation in the template is defined. A set of rules is defined for incorporating content from at least one secondary channel of content into the template. An output product is generated based upon the template, the rules and the content of the primary and secondary channels is generated.

In still another aspect what is provided is a system for processing content. The system has an input adapted to receive the supply of content and to provide this content to a processor. The processor is adapted to determine an event profile. The processor is further adapted to organize the content based upon the event profile.

In yet another aspect what is provided is a system for processing a supply of content. The system has an input adapted to receive the supply of content and to provide this content to a processor. An interface is adapted to receive an event profile and a personal profile: wherein the processor is adapted to determine rules for organizing the content based upon the event and personal profiles. The processor is also adapted to organize the content in accordance with the determined rules.

BRIEF DESCRIPTION OF THE DRAWINGS

FIG. 4 shows an embodiment of an event profile screen;

FIG. 5 shows an embodiment of a personal profile screen;

FIG. 8 shows an illustration of an embodiment output product template;

FIG. 9 shows an illustration of another embodiment output product template;

DETAILED DESCRIPTION OF THE INVENTION

Figure 1:
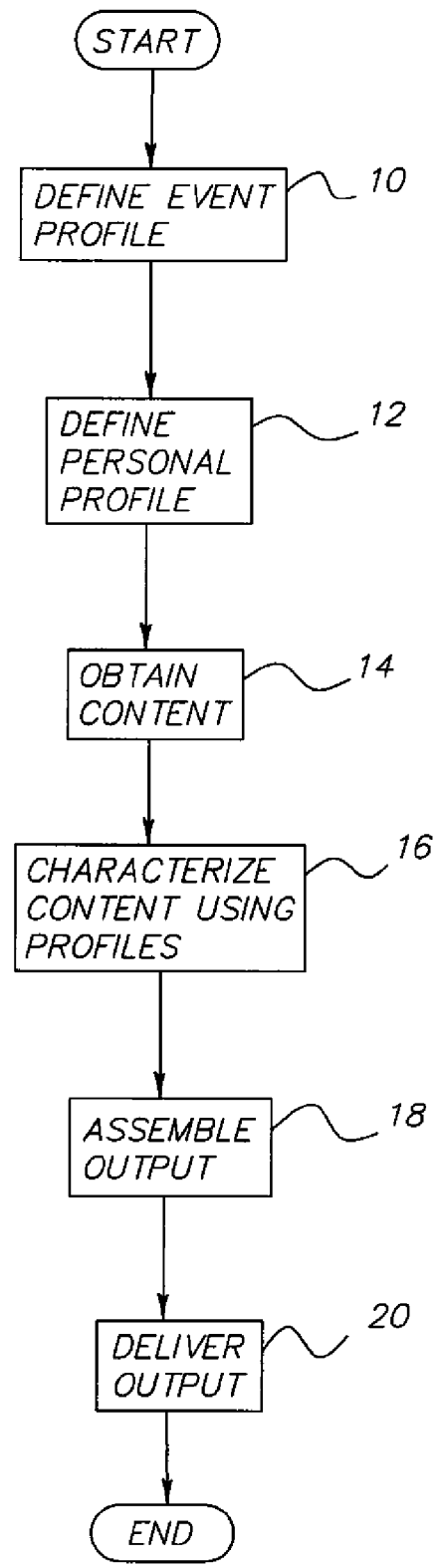
FIG. 1 shows a flow diagram of a first embodiment of the method of the present invention.

Turning now to FIG. 1, what is shown is a flow diagram of an embodiment of the method of the present invention. The operation of this embodiment will be briefly described. As shown in FIG. 1, the first step in this embodiment is to define an event profile (step 10). The event profile defines characteristics of the event so that images and other content can be captured and organized in a meaningful manner. The event profile defines an agenda of event items and the rules of the event. The event agenda is used to structure the event content. The event rules provide a way to assign a preference score to the event content.

A personal profile is also defined (step 12). The personal profile identifies persons, locations, things that are of interest to the user and further identifies an output product that the user desires. Examples of things that may be of a personal interest include particular subject matter such as key portions of an event, or the actions of a coach, stage director or of a particular participant in the event. In the latter case, the participant identified in the personal profile may or may not be involved in a key portion of an event, however, there is still a desire to observe the reaction of the non-involved participant to the key portion of the event. The personal profile provides an opportunity for a user to identify such a participant, location or other subject matter of interest. Such subject matter can be identified by supplying images of the subject matter or defining locations or areas in a scene that are likely to contain the subject matter. The output product defines the output that the user desires. Examples of output products include video streams in analog or digital form for broadcast or narrowcast, video or audio recordings on digital or tape, highlight streams, collections of still images etc.

Content from the event is then obtained (step 14). Images, audio and other content are captured using conventional cameras, electronic cameras, audio equipment and other devices. The event profile and personal profile can optionally be used to influence what content is captured during the event. For example, if the event is a soccer game and a person identified in a personal profile as being of interest is on the field, one or more cameras can follow the person. The location of the person of interest can be tracked by one or more of the cameras using image analysis or by tracking the location of a radio frequency tag or optical indicator that is connected to the person of interest. Other tracking techniques known in the art can also be used. The captured content is then organized within the framework of the event agenda based upon rules for interpreting the content that are based upon the information in the event profile and personal profile (step 16). An output product is then assembled using the organized content (step 18). The output product is then delivered (step 20).

Figure 2:
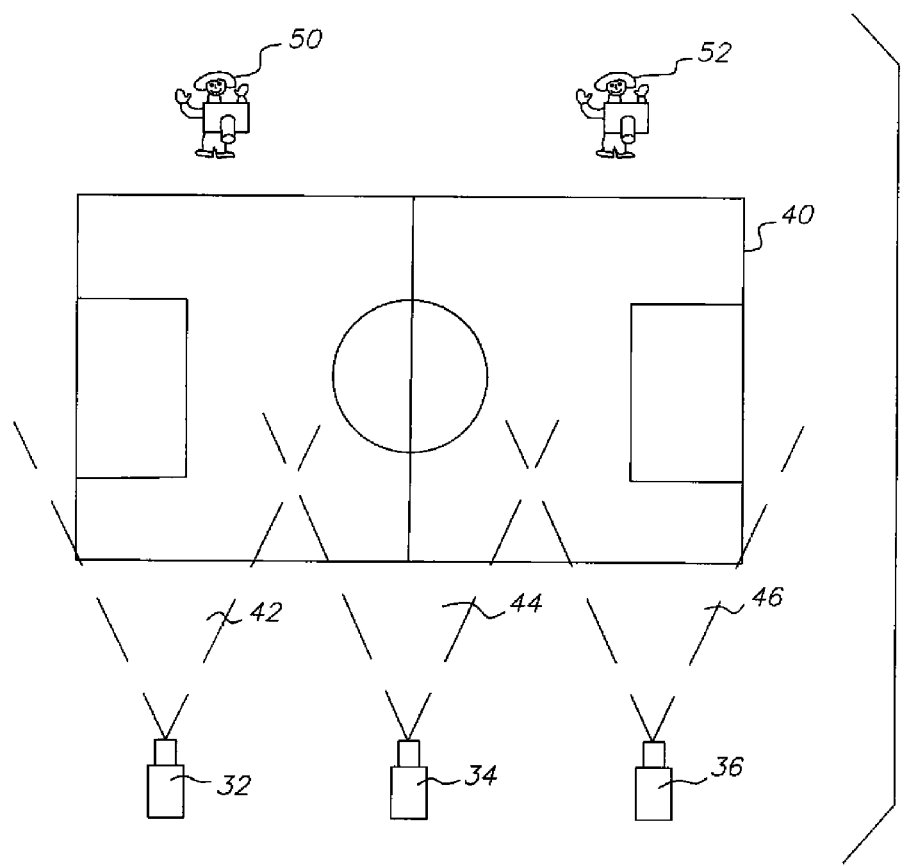
FIG. 2 illustrates an arrangement of cameras used to capture content at a soccer game.

A specific embodiment of the method will now be described with reference to FIGS. 1, 2, and 3. FIG. 2 shows a soccer field 40 having a series of cameras 32, 34 and 36 arranged to capture event content from the game. Camera 32 captures images from zone 42, while cameras, 34 and 36 are directed so that they capture images from zones 44 and 46 respectively. Cameras 32, 34, and 36 can comprise for example, analog or digital video cameras. In the embodiment shown, cameras 32, 34 and 36 are shown as being positioned to capture fixed fields of view. To ensure coverage of the entire soccer field 40, cameras 32, 34, and 36 are trained on zones 42, 44 and 46 and partially overlap, however this is not necessary. Two photographers 50 and 52 are also shown with cameras 54 and 56. Other cameras and camera systems can also be used. For example, cameras located on players, coaches booms, aircraft, and even satellites and the playing field itself can provide content. As used herein the term "camera" can comprise any of a digital or analog still video camera, digital video camera or conventional still or moving picture camera or any other device capable of capturing an image of a scene. In the embodiment of FIG. 2, content from the soccer game is captured by cameras 32, 34, 36, 54, and 56.

Figure 3:
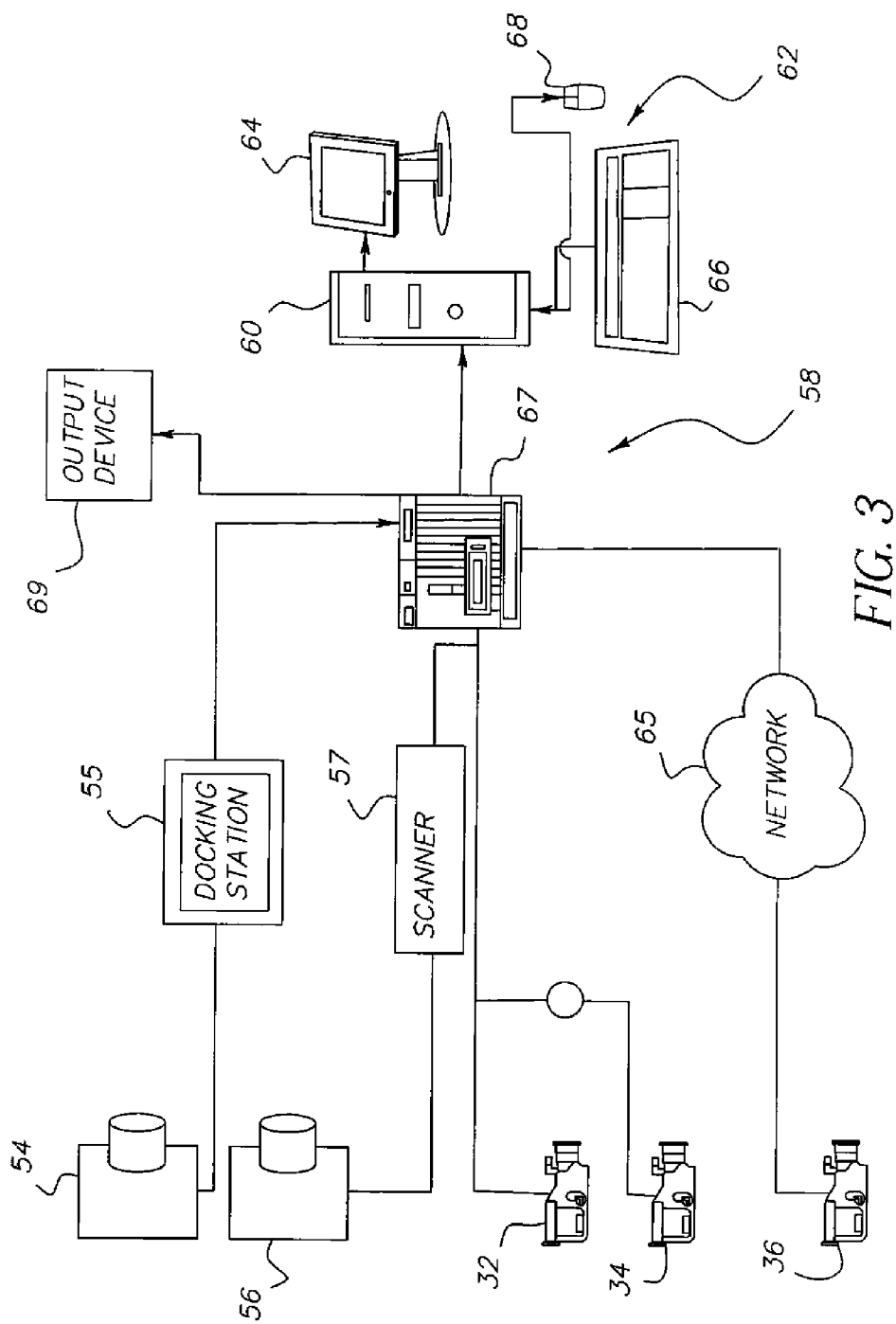
FIG. 3 shows an embodiment of a system of the present invention.

FIG. 3 shows an embodiment of a processing system 58 useful in the practice of the invention. As is shown in FIG. 3, processing system 58 includes a processor 60 which can comprise for example, a personal computer or other form of computer processor that is capable of processing digital data. Processor 60 has at least one input station 62. Input station 62 permits a user to enter event profile and personal profile information. Input station 62 can take the form of any device that can receive user inputs. In the embodiment shown, input station 62 incorporates a display 64, keyboard 66 and mouse 68 that are directly connected to processor 60. In another embodiment of input station 62, a personal digital assistant, for example, the Palm pilot personal digital assistants sold by Palm Inc. Santa Clara, Calif., USA or other such device, can be used to enter event profile and personal profile information. The event profile and personal profile information can be conveyed to processor 60 by way of a direct electrical connection, by way of a wireless transmission such as the radio frequency transmission using for example the Bluetooth communication standard or using infrared or other optical technologies.

In a further embodiment, any of cameras 32, 34, 36, 54 and 56 can also be adapted to receive event profile and personal profile information. The event profile information can be stored as metadata that is associated with images or other content captured at the event and transmitted with such content to processor 60. Where this is done, processor 60 will be adapted to extract this metadata from the transmitted content and to use this metadata in processing the content. In such embodiments, the camera acts as in input station 62.

FIG. 4 shows one embodiment of an event profile screen 70 that can, for example, be presented on display 64 of input station 62 as shown and described above with reference to FIG. 3. As is shown in FIGS. 3 and 4, the user has the opportunity to define the event as a timed sporting event and to indicate that the event is a soccer game. Based upon the definition of the event, the system can suggest an agenda. The event agenda for the soccer game includes such information as the game being composed of two halves of 30 minutes with a separation of 10 minutes for a half-time. The event profile can also identify key game events such as movement of a ball near a goal and movement of a ball across a goal line.

The event profile can be defined automatically or manually. For example, where the event is a soccer game, processor 60 can examine content to detect characteristics of a soccer field such as a soccer ball and goalposts and determine from these visual elements that the event is a soccer game and can, based on the activities of the players, determine the organization and length of the event.

FIG. 5 shows one embodiment of a personal profile screen 80 that can, for example, be presented on display 64 of input station 62 as shown and described above with reference to FIG. 3. Input station 62 can be used to enter information about the event to define personal preferences such as whether the user wishes to give preference to coverage of a particular player or to a particular area of the field such as, for example, zone 34. As is also shown in FIG. 5, the personal profile is used to request that content from cameras 54 and 56 is to be incorporated into the supply of event content 104 that is assembled to form the output product.

The output product itself is also defined as part of the personal profile entry screen 80. Personal profile screen 80 provides seven output options including making a digital video disc (DVD), a video compact disc (VCD) or video tape containing a video content from the event shown in this example as four minutes. Alternatively, another output option provided by this profile entry screen is the assembly of a photo album which contains still images selected from the event. Another output option is a video postcard option. The video postcard comprises short video clips captured during the event which are transmitted to other persons. Another option provided is the preparation of a composite postcard for mailing through regular mail. This postcard also contains a composite compilation of images captured during the event. Finally, another possible output includes assembling and transmitting a composite image, which, for example, can be an ISO A4 size page containing a plurality of images captured during the event. Such outputs can be rendered by an output device 69 such as a printer, disk drive or other device.

A multitude of other possible output products can be defined using the personal profile screen 80. Each possible output product is associated with characteristics of the content that can be incorporated into the output product. For example, where the output product comprises a still image composite, rules for creating this composite exist that define the nature of the content that can be incorporated into the output product, the extent to which content can be incorporated into the output product and the sizes in locations of the content within the composite. These rules guide processor 60 in making determinations as to what types of content is to be incorporated into the output product and what processing must be done to other types of contents to conform such other content to requirements of the output product. Because the output product is a still image composite, it will be appreciated that video content cannot be directly incorporated into the output product. However, it will also be appreciated that video content can be analyzed to identify a still image therein that can be usefully incorporated into the composite. Similar rules will be associated with other output products.

A sharing option is also provided. The sharing option allows the user to permit content that has been organized in accordance with the event profile and/or personal profile and any output products that are generated, to be shared with others. In one embodiment, organized content and output products that are derived therefrom are shared with an electronic database maintained, for example, on processor 60. This database can be stored and made available as a web page, chat board, bulletin board or other such electronic arrangement that permits others to view the organized content and any output products derived therefrom. In another share alternative, metadata that characterizes the organized content and output product is automatically generated as the content is organized and an output product is formed continuing metadata that characterizes the content. The metadata is then shared with the database. Users of the database who seek particular segments of content from an event can search the database using the metadata and can order or request the organized content and/or metadata that is associated with metadata.

In the example shown, the five cameras 32, 34, 36, 54 and 56 shown in FIG. 2 are used to capture content that is associated with the soccer game. This content is conveyed to processing system 58. Processing system 58 has an interface 67 that is adapted to receive the event content from cameras 32, 34, 36, 54 and 56. This event content can be conveyed to interface 67 by way of a wired or wireless communications network 65. This event content can also be recorded on a medium such as an optical disc, magnetic disk, electronic memory, or other tangible medium capable of recording event content. In the embodiment shown, cameras 32, 34, and 36 are each used to capture audio/video streams from, respectively, zones 42, 44, and 46. As shown in FIG. 2, zone 42, zone 44, and zone 46 are arranged so that they each capture a portion of soccer field 40 so that, collectively, a record is made of all activity on soccer field 40 at any time that cameras 32, 34, and 36 are active. In this way, cameras 32, 34 and 36 do not need to be controlled to follow the activity on the field. Further, using this arrangement of cameras, there is no risk that the value segment of the event content will not be captured because a camera was not directed at a particular portion of the field at a particular point in time. In the embodiment shown, interface 67 is adapted to receive analog audio/video signals from analog camera 32. Alternatively, an analog to digital converter (not shown) can be used to convert signals from analog video camera 32 into digital form.

Cameras 54 and 56 supply further content in the form of still images. In the embodiment shown in FIGS. 2 and 3, camera 54 comprises a digital camera while camera 56 comprises a conventional film camera.

In the embodiment shown in FIG. 3, an optional docking station 55 such as the Kodak Easy Share docking station sold by Eastman Kodak Co., Rochester, N.Y., USA is used to provide an electrical connection between digital still camera 54 and interface 67 and to support the exchange of information between digital still camera 54 and interface 67. Alternatively, images from digital still camera 54 can be transmitted to processing system 58 using any of the above described methods for conveying content to interface 67. Camera 56 records images on a photosensitive medium such as a photographic film or plate. The images are processed and converted by image scanner 57 into digital data which is then transmitted to interface 67 using any of the above described methods for conveying content to interface 67. As noted above, other information such as event profile information and personal profile information can be captured by either of cameras 54 or 56 and transmitted to interface 67 in the form of metadata that is associated with transferred content.

Interface 67 receives the supply of event content 104 and provides this content in digital form to processing system 58. After the content is received by processing system 58, the content supplied by cameras 32, 34, 36, 54, and 56 is organized. In the embodiment shown, information from the event profile and personal profile is used to help organize the received content and to form an output product that incorporates the received content. As an initial step, the general structure for the event is derived from the event agenda. Typically the event will be comprised of discrete segments. The available event content is then organized with respect to the general structure by associating the available event content with one or more of the discrete segments. The nature of the event helps to define value rules that help to organize content within each segment to separate important from unimportant content.

Figure 6:
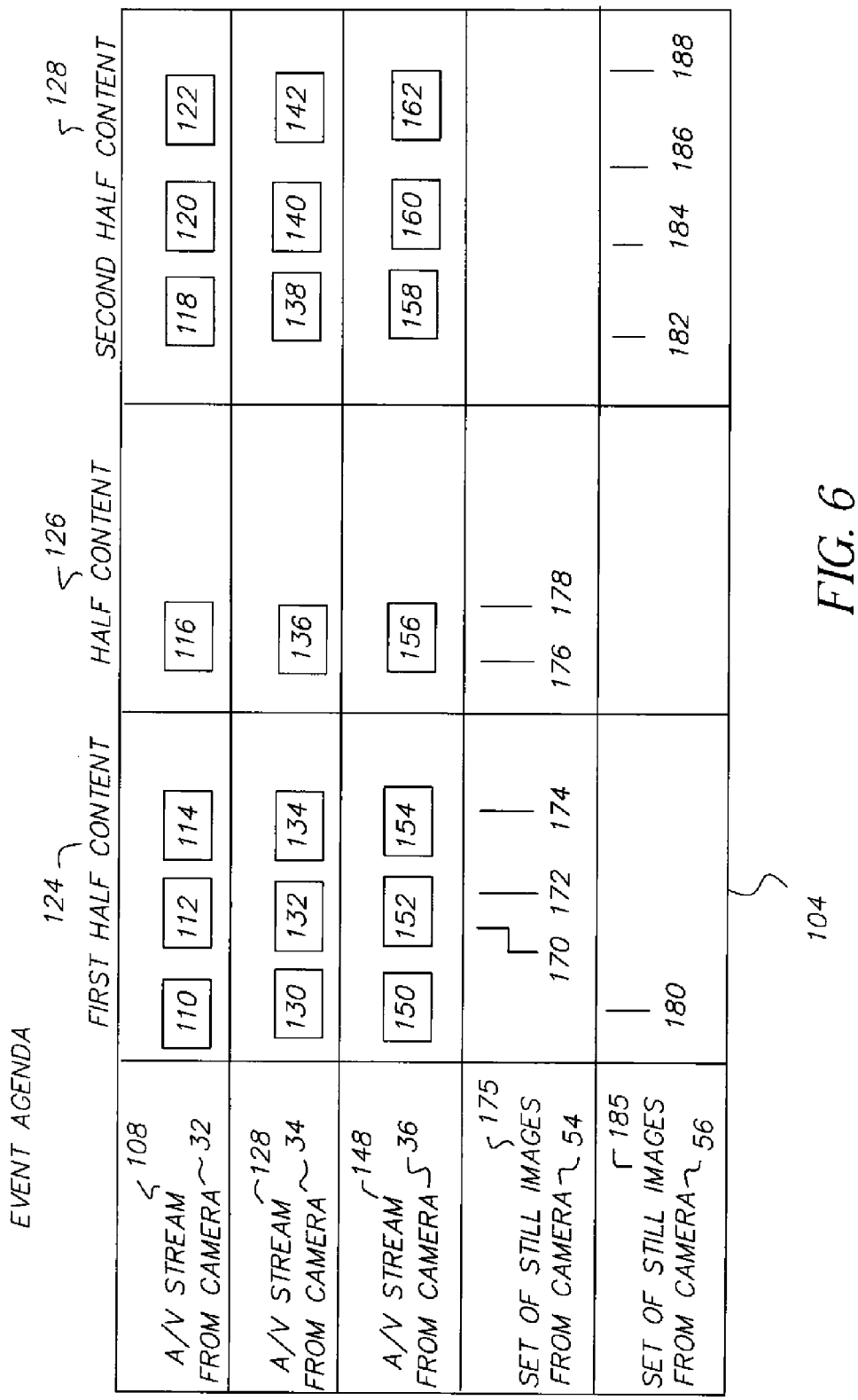
FIG. 6 shows an illustration of the use of the event agenda and event rules to organize event content.

FIG. 6 shows an illustration of the use the event agenda and event rules to process a supply of event content 104 of content captured during a soccer game. In this example, the event content comprises a first stream of images 108 with associated audio that are captured during the event by camera 32, a second stream of images 129 with associated audio that are captured by camera 34, and a third stream of images 148 with associated audio that are captured by camera 36. The supply of event content 104 captured during the soccer game also includes a set of digital still images captured by camera 54 and a set of still images 185 captured by a film still camera 56 and converted into digital form. The still images are illustrated in FIG. 6 as lines 170-188.

As described above, the event profile defines the event as a soccer game having three agenda items, a first half comprising 30 minutes of content, a half time comprising 10 minutes of content and a second half comprising 30 minutes of content. Processing system 58 analyzes content from each of cameras 32, 34, 36, 54 and 56, and sorts this content into content from the first half, content from the second half, and content from half-time. Various criteria can be used to sort this content. In a simple example, chronological metadata can be associated with each of the streams 108, 129, 148 and each of images 170-188 at capture. Images can be organized chronologically based upon this chronological metadata. Where an event proceeds according to a rigorous time schedule, this information can be used to organize the content in accordance with event agenda items.

Where an event offers a less rigorous time schedule, other analysis of the content can be used to organize the content according to the agenda. For example, video streams captured within the first 30 minutes of capture made by cameras 32, 34 and 36 can automatically be associated with the first half content 124. Similarly, video streams captured within the last 30 minutes of capture made by cameras 32, 34 and 36 can automatically be associated with the second half content 128. To the extent that the first half extends longer than 30 minutes because of interruptions in play, a determination as to which portions of the remaining video stream is to be associated with the first half content 124, and which is to be associated with the half-time content 126, can be made on the basis of, for example, the audio detection of a whistle or horn indicating the start of half-time. Image analysis can also be used for this purpose. For example, the absence of a requisite number of players on the playing field can be detected and used to determine that first half play has ended. Similarly, half-time content 126 can be separated from second half content 128 by timing the amount of time that elapses after the end of the first half and associating content that occurs after ten minutes from the end of the first half with the second half content 128. Alternatively, image analysis can be used to make this determination in that the video streams captured by cameras 32, 34 and 36 can be analyzed to determine whether any requisite number of players is positioned on the field in an alignment that indicates the start of the second half.

Organization of the content in accordance with the event agenda can be used for processing the event content to form many useful types of output. However, further analysis and organization of the content is typically required in order to permit the event content to be reduced into an output product. In the embodiment shown in FIG. 6, the event content is further organized into segments of related content. Each segment is then assigned a value score. Rules for separating the content into segments and for scoring the value of the content of each segment are based upon rules that are derived from the nature of the event in general and rules for interpreting content that is associated particular agenda items within the event. For example, the rules used to score the relative value of halftime activities at a soccer game will be different than the rules used to score the relative value of first half and second half activities.

In the embodiment shown, the first half content 124 is divided into segments using rules that are based upon the knowledge that the content being analyzed is content captured during a first half of a soccer game. For example, a simple rule for segmenting content is to start a new segment whenever the soccer ball transitions from one of zones 42-46 to another, when the ball leaves soccer field 40, or when the ball passes between the goal posts.

In this way, event content can be processed and organized based on the agenda items and the relative value of the content. Further, the event profile itself can associate certain agenda items with a relative value. The relative value of the content and the relative value of the agenda items can be examined to associate an overall value score for each segment of content. This organization is useful in making automated decisions as to what content is to be included in an output product.

The value of each content segment can also be determined by analysis of the content using knowledge that the content being analyzed is content that has been captured in the first half of a soccer game. For example, this knowledge can be used to help determine a value score for a content segment based upon the arrangement, location and identity of players in the segment. For example the presence of an inordinate number of players and the ball within zone 42 or zone 46 shown in FIG. 2 can signal a greater value. More detailed image analysis operations can also be used to assign the value scores. The value score given to a content segment can be increased if it is detected that the soccer ball passes between the goal posts and within a period of time thereafter, the players redistribute to positions that are associated with the start of play after a goal is scored.

Value scores can also be determined by examining the content for other event cues. For example, the raising of a yellow card or red card by a person with a striped shirt or the blowing of a whistle or loud cheering or booing of a crowd of spectators can be used to identify content as having higher value.

Post event summaries, reports, statistical analyses, box scores, and edited highlights can also be supplied to processing system 58 and used to help organize the content. For example, a simple scoring summary that identifies when players for each team scored a goal can help to determine a correspondence between event content and event agenda items. This allows for more accurate assignment of content to appropriate agenda items which in turn helps to ensure that the appropriate rules are used to assign relative value scores to the content. Further, the relative value score of particular content can be increased where the content is described in a summary, report, statistical analysis, box score or edited highlight.

It will be appreciated that the degree of segmentation of the video content can be variable. For example, each video frame can be assigned an individual value score. This, frame by frame value score for example, can be useful in extracting still images from streams of the video for incorporation in a output product that requires such still images.

FIG. 6 shows an illustration of relative value scoring as applied to the supply of event content 104 supplied from the example soccer game. As is shown in FIG. 7, each content segment of video 110-122, 130-142 and 150-162, and each still image 170-188 is assigned a relative value score based upon the event rules and agenda.

After the supply of event content 104 has been organized based on the agenda items, segmented and scored for value according to the event rules, personal profile information can be used to further refine the relative value scores. For example, where the user has designated that a particular participant of an event is of greater value, the relative degree of value of content that is associated with that participant can be increased. Similarly, where a user has designated that a particular agenda item is of greater relative value, the relative degree of value of the content that is associated with the agenda item is increased. It will be appreciated that the personal profile can be used to define other events and circumstances that are of greater value to the user. These events and circumstances can be detected using chronological, image content, audio content or other analysis of the supply of event content 104.

The value scoring of content is usefully employed in making automated decisions as to which content is to be incorporated into an output product. In the example of the soccer game, at least 180 minutes of game related content is recorded by cameras 32, 34 and 36. Where the desired output product comprises a video output product that is designated to last no longer than two minutes, at least 178 minutes of content must be omitted. The value score for the recorded content can be used to determine which portions of the recorded content should be included in this two-minute presentation. Further, the agenda provides a structure for incorporating higher relative value scoring information in a rational and easily understood manner so that for example, content that has a higher relative value score but that is recorded subsequent in time to content that has a lower relative value score will be presented after the content that has the lower relative value score where the agenda indicates that the content having the lower relative value score occurred prior to the content having a higher relative value score.

Figure 7B:
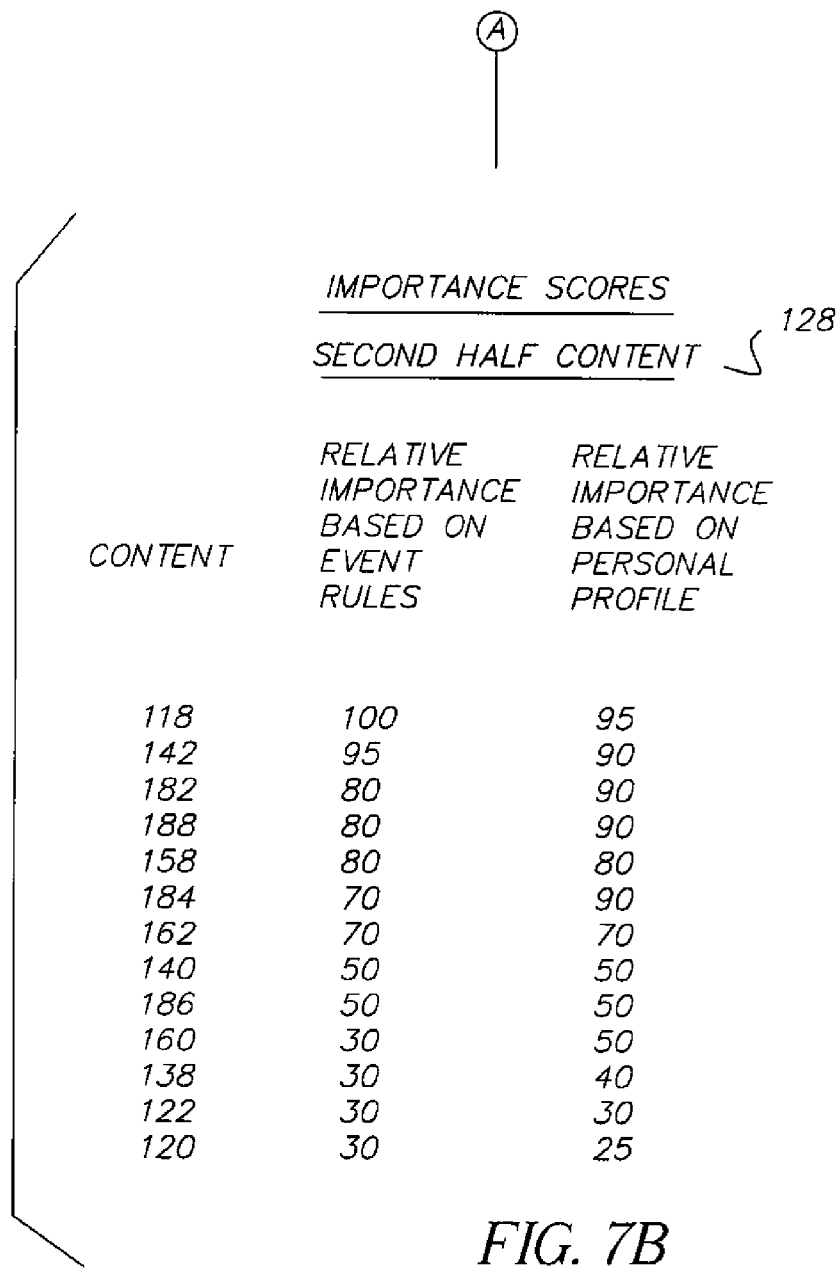
FIG. 7B shows another illustration of value scoring as applied to the supply of event content.
Figure 7:
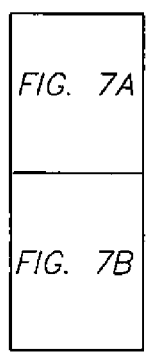
FIG. 7A shows an illustration of value scoring as applied to the supply of event content.

FIG. 7 also shows an example of the value scoring of the pool of event content 104 when rules derived from the personal profile are used. In this example, the relative value score based upon event rules and relative value score based on personal profile rules are added to create total relative value score which is associated with each element of the pool of event content 104. Other ways of weighing, scoring and combining the event profile base value scores and personal profile based value scores can also be used.

FIG. 8 shows an illustration of an output product template 200. The output product template defines the nature the output product, such as whether the output product is a video product, a still image product, or audio product and the output elements that are to be incorporated into the output product. Output product template 200 also defines the way in which output elements are to be assembled and presented. In this regard to output product template 200 defines a pre-established text audio or video lead ins, trailers, invitations, and overlays that are to be incorporated with the output product. In the example of FIG. 8, output product template 200 is defined as a video stream of a predefined length that is shorter than the duration of the captured content at the event. The stream incorporates three output elements a first output element 220, a second output element 230 and a third output element 240. A predefined title element 210 precedes output elements 220, 230 and 240 and predefined transitions 212 and 222, are located between first output element 220, and second output element 230 and between second element 230 and third output element 240.

To provide output product template 200, is necessary for processing system 58 to select from among the set of video segments including content segments 110-112, 130-142, and 150-162 those video segments that will be used as output elements 220, 230 and 240. The output product defines criteria for selecting and ordering of the segments. For example, first output element 220 indicates that it is to be selected from content from the first half content 124. Similarly, second output element 230 indicates that it is to be selected from halftime content 126 and third output element 240 indicates that it is to be selected from second half content 128. On the basis of this information, processing system 58 examines first half content 124 to identify the video segment having the highest total relative value score. In the embodiment shown, this is content segment 112. Content segment 112 is then extracted from first video stream 108 and incorporated as first output element 220 of output template 200. Processing system 58 then examines the halftime content to identify the video segment from the half time content 126 having the highest total relative value score. Referring again to FIG. 7, content segment 136 is identified as being the video segment having the highest total relative value score. Accordingly, content segment 136 is extracted from first stream 108 in incorporated as second element 230 of output product 200. Processing system 58 examines the second half content and determines that content segment 118 has the highest relative total value score and incorporates content segment 118 as third output element 240. In this way, value scores are used to determine the content of the output product and to automatically assemble output product that is useful to the user.

In practice, the duration of a selected segment, for example, content segment 112 of a video stream may have a different duration than the output element into which it is incorporated. Where this occurs, the selected segment may be re-examined to extract the portion of the segment meeting the conditions of having the highest total value relative to other portions of the segment and being sized for recording in the duration allotted for the output element. Further, where the selected segment has a duration than a shorter than the allotted time for the output element, additional video segments or still image segments can be incorporated in a manner so as to occupy the allotted time.

In another embodiment, shown in FIG. 9 an output product template 250 has a predefined length of video space which is to be occupied by the three output elements of content having the highest total relative value score. Where this is done processing system 58 examines the pool of event content 104 to identify the video segments having the highest total relative value and incorporates these segments by order of highest total relative value score into the output product to fill the recording capacity of the output product template 250. Using these selection criteria, content segments 112, 118, and 142 are selected to be incorporated in output product template 250.

Figure 10:
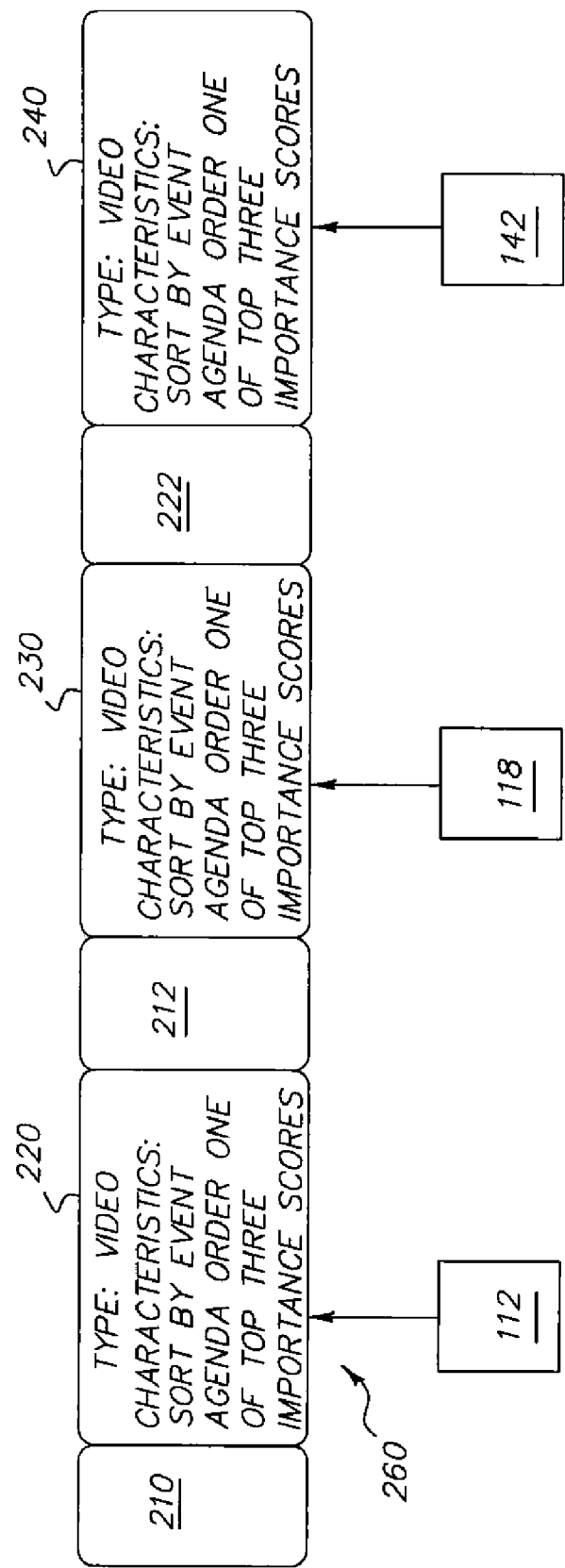
FIG. 10 shows an illustration of another embodiment output product template.

Alternatively, processing system 58 can identify the set of segments having the highest total relative value and incorporate these segments into the output product in an order established by the event agenda and chronological information associated with the content segments. In the example of FIG. 10, an output product template 260 is shown that incorporates the three highest priority video segments in an order that is determined by the agenda. As shown in FIG. 10 content segment 112 is captured in the first half and will be presented first in the output product. Content segments 118 and 142 are associated with the second half. Because content segment 118 occurs prior in time to content segment 142 in the second half, content segment 118 will be incorporated into the output product as the second output element while content segment 142 will be incorporated in the output product as the third output element.

In accordance with the present invention, an output product can adapt content that has been captured in one format, for example in a still image format, and can incorporate this into a video format so that it appears for example, as a still image which is presented to a video and observer for a predefined period of time in a slideshow type format or in overlays or excerpts, or split screen type presentations that are presented concurrently with the display of the video stream. Alternatively, still images can be extracted from video streams and incorporated into composite still image output products. In still another alternative, audio streams can be captured from video signals and sounds captured in concert with the capture of a still image so that an audio output product can incorporate video associated audio signals.

Another example of an output product is a composite image. Commonly, such composite images are formed by defining a predefined template which defines the characteristics of the images to be incorporated into the template as well as text and other information that is also to be incorporated into the template. Examples of software enabling the formation of such a composite include Easy Share Software sold by Eastman Kodak Company, Rochester, N.Y., USA, and Photo Express—My Scrapbook edition software sold by Ulead Systems, Taipai, R.O.C. These types of scrapbooking software require the user to select the images to be incorporated into the composite image. In the present invention, an output product template is identified by a user and, based upon the event agenda, rules, user profile, value scores, and images are automatically selected and incorporated into the template. This reduces the amount of time and effort that must be invested in forming such composite images.

Yet another example of an output product is an edited audio stream. Such an edited audio stream could be useful, for example, where the event comprises a stage production such as a musical. In this embodiment, audio that is associated with video strains of a pool of event content can be extracted and analyzed using the event agenda, the event rules, personal profile and the total relative value scores chronological data, audio analysis and speech recognition to identify selected portions of the idea content for inclusion in the edited audio stream.

Figure 11:
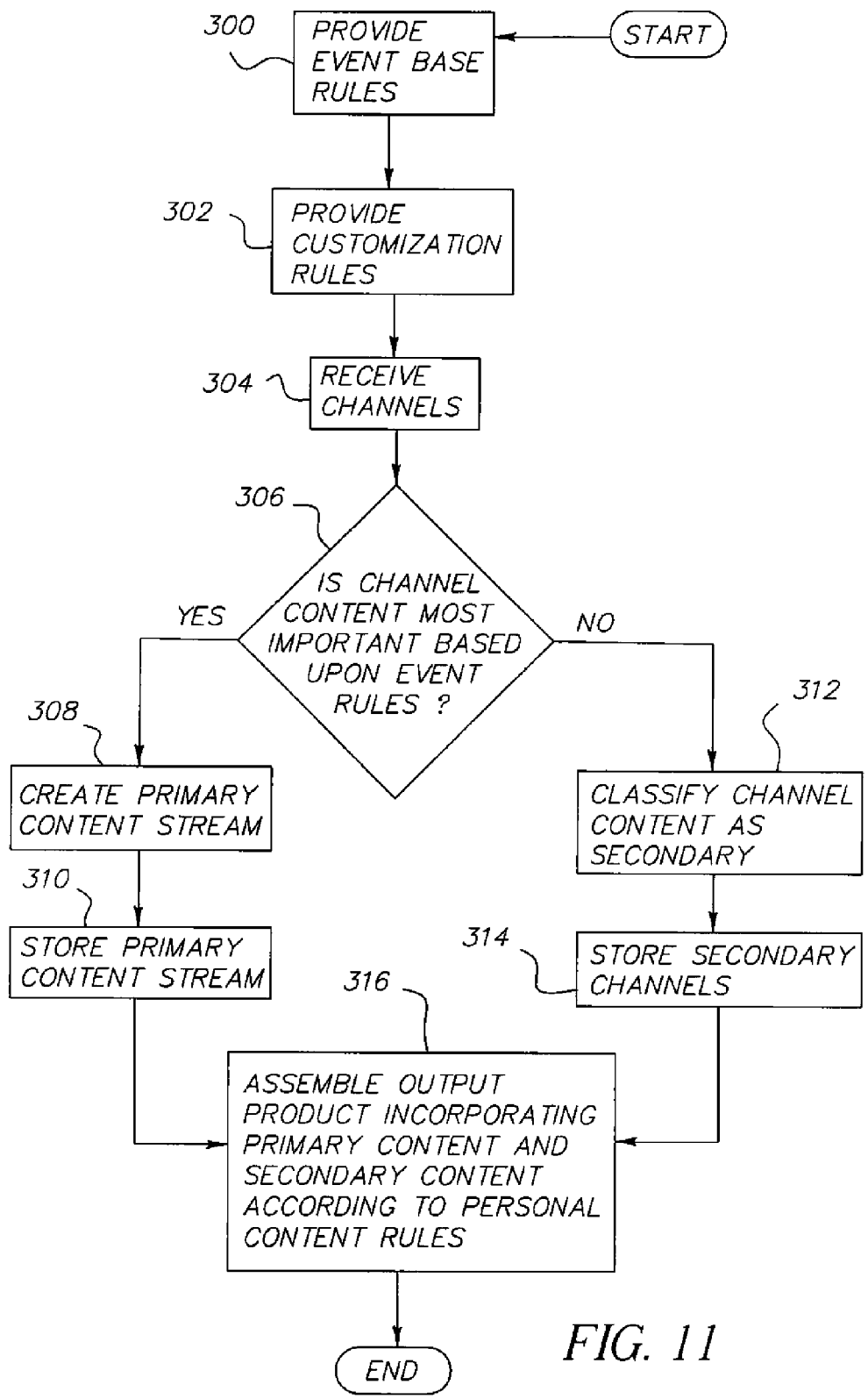
FIG. 11 shows a flow diagram of another embodiment of the method in accordance with the present invention.

FIG. 11 shows a flow diagram of another embodiment of a method in accordance with the present invention. In this embodiment, event content is received in multiple channels. These channels can comprise for example video streams from cameras 32, 34, and 36. Where practicable, other channels of content, such as for example channels of content supplied in the form of images from cameras 54 and 56 can also be incorporated into the primary stream. Selected portions of content from these channels are then automatically assembled to form a primary stream of event content that is customized to the interests of a user in the manner that will now be described.

According to this embodiment, event based rules for interpreting the content of the channels are provided (step 300). The event rules can be derived from event profiles or from analysis of the content on the channels. Rules for customizing the content are then provided (step 302). In this embodiment, the channels of content are received (step 304) and analyzed based upon the event rules to determine, at any point in time, the channel that is providing the event content having the highest value score (step 306). This analysis can be in the form of chronological analysis, audio and video analysis. Content from the channel having the highest value score is incorporated into a primary data stream (step 308). The primary data stream can optionally be stored (step 310). Content from the other channels is classified as to be secondary content (step 312). The secondary content can be stored for example in a supply of secondary content (step 314). An output product such as an output video stream is formed by assembling primary content and secondary content using the rules for customizing the content (step 316). In the embodiment shown, secondary content is assembled into the output product on the basis of rules derived from information contained in the personal profile.

For example, in one embodiment, secondary content is analyzed and assigned with a value score that is adjusted based upon the user's rules. Where the adjusted value score for the secondary content exceeds the value score of the primary content, then the secondary content will be inserted into the primary stream.

Using the method shown in FIG. 11, the output product will automatically present primary content that is supplemented by secondary content that is preferred by the observer. This can be used, for example, to form a video record of an entire soccer game with a particular emphasis on coverage of a particular player. The video output stream can for example, contain content from the primary content stream having content from the pool of secondary content interposed therein. Alternatively the video output can for example provide a primary stream of content with a secondary content presented in a complementary form such an inset image or overlay image. Examples of output products that can be generated in accordance with this embodiment can comprise a record of an event, such as a commemorative video tape, digital video disk, data file or other form of recording of the content of the event. Other types of output products can also be produced as described generally above.

The embodiment of FIG. 11 is also useful in automatically creating an output product that contains event content yet adapts the coverage of the event to the interests of the recipient of the event content in real time. One example of such an output product is broadcast-type stream of content that provides coverage of an event from beginning to end. Such an output product can be transmitted to remote viewers using telecommunication networks that support computer to computer based video transmission such as the internet, television cable, cellular and satellite telephones or using other new networks that have sufficient bandwith to carry the output stream in real-time.

Another useful embodiment of such an output product is an output agent that identifies streams of content having high value scores and that automatically provides these streams to remote users. The value scores are determined by analyzing the content based upon the event rules and the rules for customizing the content. The rules can be applied in real time. For example, the content of the event can be analyzed in real time using rules that identify content that suggests that the content to follow will be of great value. In this embodiment, only such content will be provided to a remote user. This approach has the advantage of providing the content in real time to a recipient without requiring the recipient to observe the entire content of the event.

However, it is often the case that the value of a segment of content can best be determined after the circumstances giving rise to the segment of content have occurred. For example, a soccer ball may be kicked about the front of a soccer goal many times without a score. If a user has requested in his or her user profile to view only scores by a particular player, providing content to him or her every time the ball is kicked by any player who is near the goal can be distracting as many times such content will not involve a score involving the player of interest. Thus, in another useful embodiment of this method, rules can be used which interpret segments of content immediately after they occur and identify value segments based upon such retrospective analysis. In this way, the value of a segment of content can be determined from the content of the segment as a whole. For example where the user has indicated an interest in viewing only scores, segments that include scores are identified at the conclusion of the segments and such segments are quickly provided to the viewer in an instant replay mode. This approach can be particularly useful in providing such value segments to users who are at locations that are remote from the event as it permits such remote users to receive event content very soon after it happens but does not require the remote users to observe content that they are not interested in.

In still another embodiment, a flow diagram is shown of a method for automatically customized pre-edited content to reflect the user's interests. Examples of such pre-edited content include but are not limited to a professionally produced content stream such as the edited video content of broadcast by a television network covering a sporting event or the content captured by a professional videographer covering an event such as a wedding. As discussed generally above, it is often very expensive to have content pre-edited in this way. Accordingly, such content is adapted to have appeal to the broadest set of possible viewers and is not customized to match the interests of individual viewers. In this embodiment, secondary content is automatically incorporated into the pre-edited content to cause the pre-edited content to reflect situations that are of interest to a user.

Examples of such secondary content include other channels of content from the event such as, for example, content that is captured by the television network at the sporting event but not included in the primary stream, content that is captured by WebCams, amateur videographers attending the event, or other content sources at the same event. While such secondary content is often of little value to the majority of users to whom primary content is directed, such secondary content is often of particular interest to other observers such as home viewers who have a particular affinity for particular players or event participants, or attendees of the event who may have content of themselves at the event, or content which depicts the vantage point that they had at the event. Such observers may wish to customize the content of the event coverage so that their viewing experience during the event, or afterward, can reflect their interests.

Accordingly, in this embodiment, the personal profile is entered and is used to define conditions under which the pre-edited content is to be modified to reflect the interest of the observer. The primary data stream can incorporate pre-defined segments that are adapted to be filled in with content from the secondary data streams selected by a user. For example, a segment of the pre-edited content can be reserved for describing a player. Where a user has indicated an interest in a particular player, this segment can be allocated principally to a discussion of that player as indicated in the personal profile. Similarly, segments of the event can be replaced by secondary content. For example, where the pre-edited content has scenes of spectators at a stadium, a user who is at the stadium for the event can elect to have a video of the event made that replaces the spectator scene in the pre-edited segment with spectator scenes of the section of stadium where the user sat in order to personalize the video. Similarly a user at home can elect incorporate images of sections of the stadium wherein friends or family are sitting in order have a sense of participation in the event.

Figure 12:
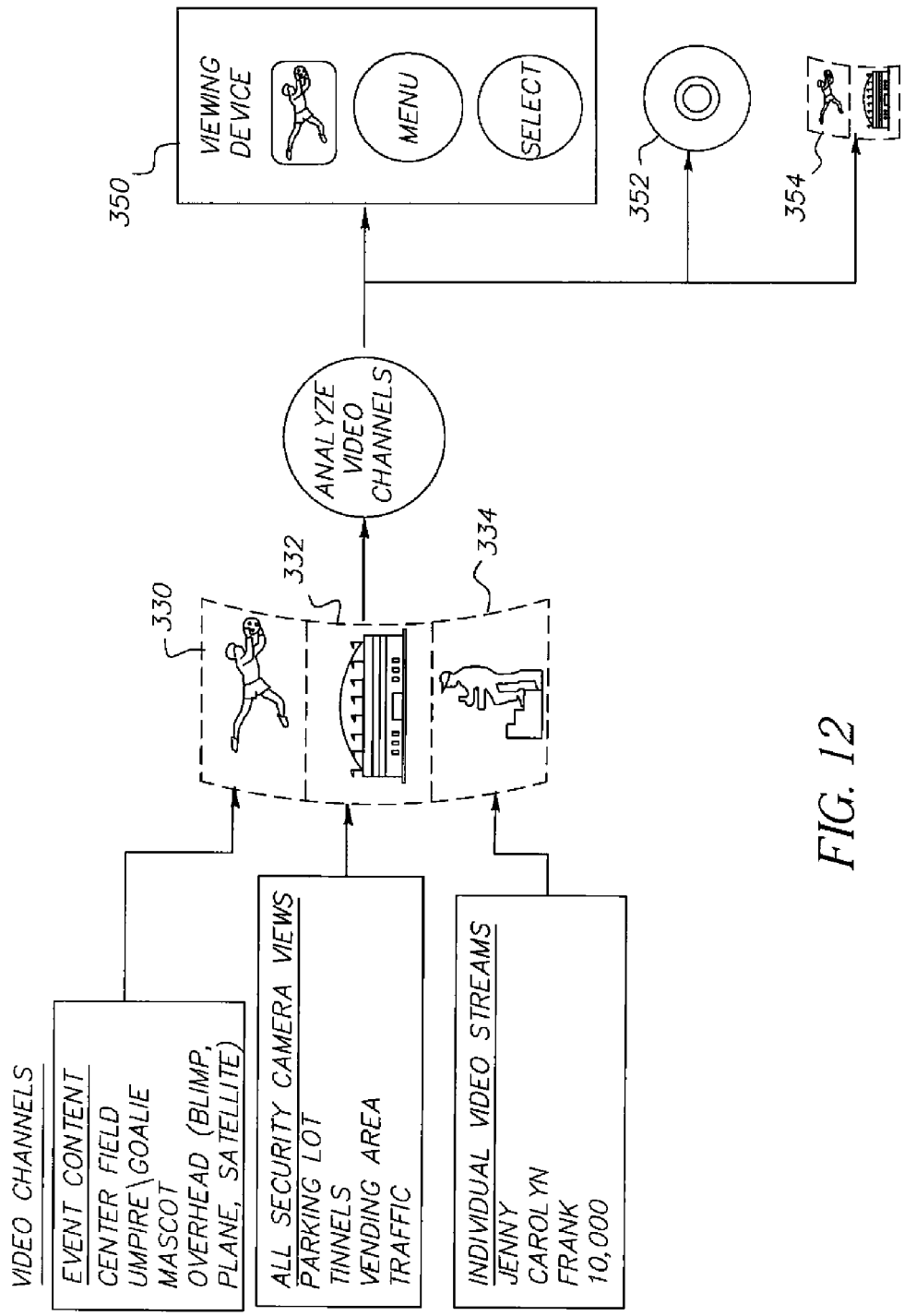
FIG. 12 illustrates an example of content capture in the context of a soccer game.

FIG. 12 illustrates another example of content capture in the context of a professional soccer game. In the embodiment shown in FIG. 12, three principal classifications of event content are captured during the soccer game: event content 330, experiential content 332 and individual content 334. Event content 330 includes pre-edited content which depicts the activities of the game itself such as camera views of the players and the playing field as described generally above. Event content 330 also includes content that is not incorporated into the edited content. Experiential content 332 associated with the event is also captured. Such an experiential content can include views of the spectators at the stadium, views of event content taken from the perspective of a particular fan area, views of the parking lot, vending areas, and traffic surrounding the stadium, and other views from around the stadium that provide content that one who attends the game would experience. Individual content 334 comprises content that is captured by any other persons for sample spectators who attend the game. This individual content 334 can include content that depicts a game event from the perspective of a spectator and content that includes other subject matter of interest to the photographer such as images of the photographer's family attending the game. Experiential content 332 and individual content 334 helps one who is viewing the event to enjoy the event in the same way that one who was similarly stationed at the event would enjoy it. Where such experiential content 334 is incorporated into a recorded output product, such experiential content 334 also permits those who did attend the event to relive the actual experience in greater detail.

Figure 13:
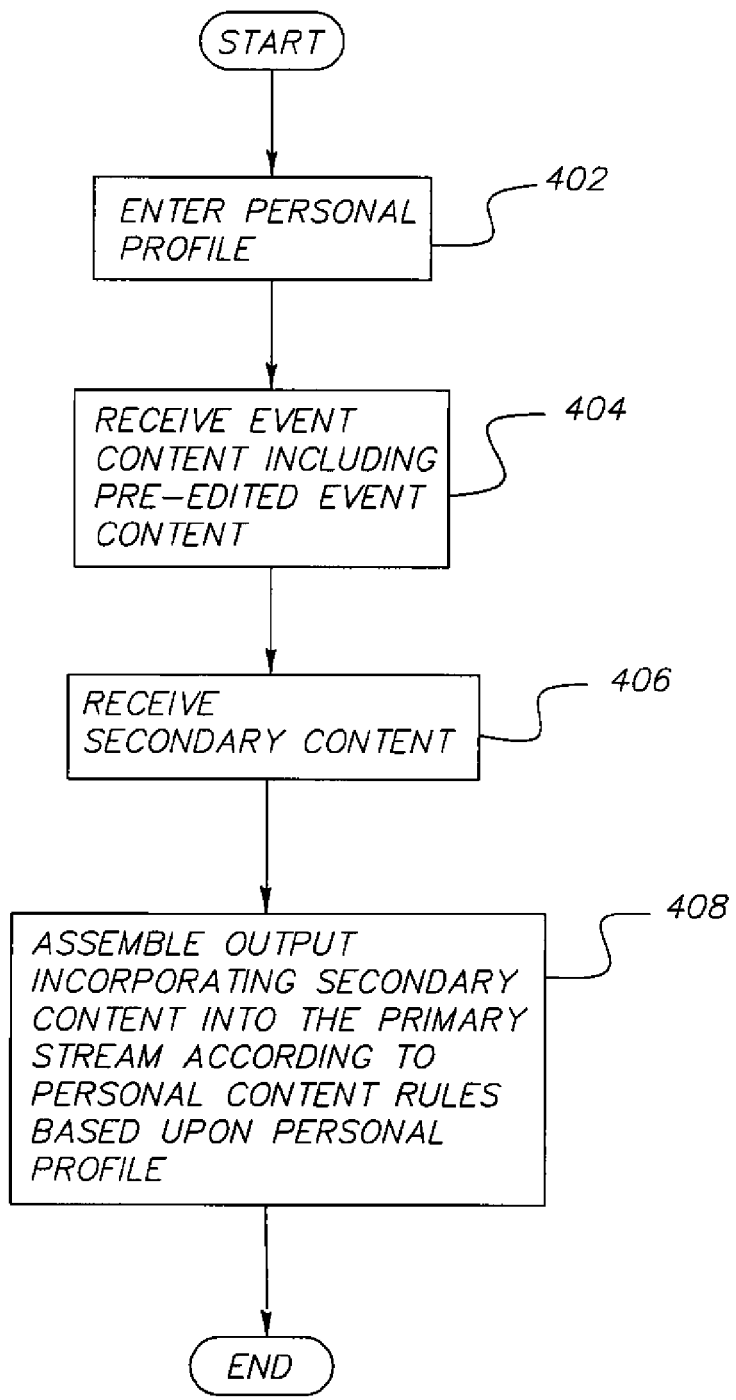
FIG. 13 shows a flow diagram of another embodiment of a method in accordance with the present invention.

FIG. 13 shows a flow diagram of a method for processing this content. In this embodiment, a broadcast network captures and organizes video streams containing event content into a primary content stream that is used to provide the event coverage to a broadcast audience. Typically, the primary content stream will also incorporate some amount of experiential content 332 and potentially some individual content 334. All content that is not incorporated into the primary data stream 336 is incorporated into the secondary content 338. Primary content stream 336 can be broadcast over a network and/or provided to spectators at the event who have viewing devices 350. A viewer at the event having a viewing device 350 or a viewer at a remote location having a viewing device 350 can enter a user profile (step 402). Information in the personal profile can be used to define whether the user wishes to view only the primary content stream or wishes to incorporate additional content such as experiential content 332 and individual content 334. Rules for incorporating experiential content 332 and individual content 334 into the primary content 336 are then applied and a personalized output product is produced having event content, 330, experiential content 332 and/or individual content 334 combined as desired (step 408). Examples of such a personalized output include a personal viewing experience presented by way of viewing device 350, a record of the experience recorded for example on an optical disk or other tangible medium 352 and a digital or analog electronic record that 354 that is otherwise transmitted or stored.

In one embodiment, a homebound viewer can use the personal profile to incorporate event content 330 and experiential content 332 in a manner that simulates the experience of traveling to the event and sitting in a particular location such in seats occupied by friends and family. Where friends and family so choose, they can supply individual content 334 to the home user and even interact with the home user during the event using viewing device 350. Alternatively, a family member can cause event content 330, experiential content 332 and individual content 334 to be incorporated into a commemorative record that simulates the event experience. Information in the user profile of homebound users can also define technical specifications for the output product that will optimize the broadcast experience based upon the type of viewing devices that the home bound users have available.

In any embodiment described herein any input station 62 can be adapted to provide a signal during an event that indicates that a particular event is one of particular value. This can be used to permit a user to manually select particular content for inclusion in the output product. This can also be used to allow the user to cause processing system 58 to increase the relative value score of the indicated content.

In the preceding description, embodiments of the present invention have been described as a method. However, in other embodiments, the present invention comprises a computer program product for performing the method embodiments described. t The computer program product embodiments of the present invention can be utilized by any well-known computer system, such as a processing system 58 of the type shown in FIG. 3. However, many other types of computer systems can be used to execute the computer program product of the present invention.

Computer program product embodiments of the present invention may be stored in a computer readable storage medium. This medium may comprise, for example, magnetic storage mediums such as a magnetic disk (such as a hard drive or a floppy disk) or magnetic tape; optical storage mediums such as an optical disc, optical tape, or machine readable bar code; solid state electronic storage devices such as random access memory (RAM), or read only memory (ROM) or any other physical device or medium employed to store a computer program. Computer program product embodiments of the present invention may also be stored on computer readable storage medium that is connected to a processing system such as processing system 58 by way of the internet or other communication medium. Those skilled in the art will readily recognize that the equivalent of such a computer program product may also be constructed in hardware.

The computer program product embodiments of the present invention may make use of audio, video, and other content manipulation algorithms and processes that are well known. Accordingly, the preceding present description has been directed in particular to those algorithms and processes forming part of, or cooperating more directly with, embodiments of the present invention. Thus, it will be understood that the computer program product embodiments of the present invention may embody algorithms and processes not specifically shown or described herein that are useful for implementation. Such algorithms and processes are conventional and within ordinary skill in such arts.

Other aspects of such algorithms and systems, and hardware and/or software for producing and otherwise processing the audio, video, or other content involved or cooperating with the computer program product of the present invention, are not specifically shown or described herein and may be selected from such algorithms, systems, hardware, components and elements known in the art.

The invention has been described in detail with particular reference to certain preferred embodiments thereof, but it will be understood that variations and modifications can be effected within the spirit and scope of the invention.

PARTS LIST

| | |
|---|---|
| 10 | establish event profile step |
| 12 | define personal profile |
| 14 | obtain content step |
| 16 | assemble a characterize content step |
| 18 | assemble output product step |
| 20 | deliver output product step |
| 30 | soccer field |
| 32 | analog Video camera |
| 34 | digital Video camera |
| 36 | digital Video camera. |
| 40 | soccer field |
| 42 | zone |
| 44 | zone |
| 46 | zone |
| 50 | photographer |
| 52 | photographer |
| 54 | digital still camera |
| 55 | docking station |
| 56 | film still camera |
| 57 | scanner |
| 58 | processing system |
| 60 | processor |
| 62 | input station |
| 64 | display |
| 65 | wireless communications network |
| 66 | keyboard |
| 67 | interface |
| 68 | mouse |
| 69 | output device |
| 70 | event profile screen |
| 80 | personal profile screen |
| 104 | supply of event content |
| 108 | first stream |
| 110 | content segment |
| 112 | content segment |
| 114 | content segment |
| 116 | content segment |
| 118 | content segment |
| 120 | content segment |
| 122 | content segment |
| 124 | first half content |
| 126 | half time content |
| 128 | second half content |
| 129 | second stream |
| 130 | content segment |
| 132 | content segment |
| 134 | content segment |
| 136 | content segment |
| 138 | content segment |
| 140 | content segment |
| 142 | content segment |
| 148 | third stream |
| 150 | content segment |
| 152 | content segment |
| 154 | content segment |
| 156 | content segment |
| 158 | content segment |
| 160 | content segment |
| 162 | content segment |
| 170 | image |
| 172 | image |
| 174 | image |
| 175 | set of still images |
| 176 | image |
| 178 | image |
| 180 | image |
| 182 | image |
| 184 | image |
| 185 | set of still images |
| 186 | image |
| 188 | image |

PARTS LIST

| | |
|---|---|
| 200 | output template |
| 210 | title element |
| 212 | transition |
| 220 | first output element |
| 222 | transition |
| 230 | second output element |
| 240 | third output element |
| 250 | output product template |
| 260 | output product template |
| 300 | provide event rules step |
| 302 | provide customization rules step |
| 304 | obtain content step |
| 306 | analysis step |
| 308 | incorporate content into primary stream step |
| 310 | store primary stream step |
| 312 | classify content as secondary content step |
| 314 | store secondary content step |
| 316 | assemble output step |
| 330 | event content |
| 332 | experiential content |
| 334 | individual content |
| 336 | primary content |
| 338 | secondary content |
| 350 | viewing device |
| 352 | tangible medium |
| 354 | digital or analog electronic record |
| 402 | enter user profile step |
| 404 | receive event content step |
| 406 | receive secondary content step |
| 408 | assemble output step |

What is claimed is:

1. A method implemented by a data processing system, the method for organizing event content of an event in the form of digital data, the method comprising the steps of:

determining an event profile that defines an event agenda comprised of a sequence of event agenda items of which the event is comprised, and event rules for analyzing the event content to associate segments of the event content with event agenda items and to assign a relative value score to each segment, wherein the rules are derived from the nature of the event;

obtaining an output product template;

obtaining the event content after determining the event profile; and organizing the event content by determining which segments of the event content are associated with one of the event agenda items and assigning a relative value for each of the segments using the event rules, producing an output product using the output product template and event rules; wherein the relative values of each segment is used to automatically produce the output product, wherein the output product template defines the output product to be produced as a video, still image, composite image or audio products.

2. The method of claim 1 wherein the relative value of a segment is determined in part upon the event item with which the segment is associated and in part upon the event rules.

3. The method of claim 1, wherein the event rules are adapted to include content based upon content analysis rules associated with the event.

* * * * *